United States Patent
Liu et al.

(10) Patent No.: US 12,305,000 B2
(45) Date of Patent: *May 20, 2025

(54) POLYAMIDE TERPOLYMERS FOR MANUFACTURE OF TRANSPARENT ARTICLES

(71) Applicant: AdvanSix Resins & Chemicals LLC, Parsippany, NJ (US)

(72) Inventors: Haoyu Liu, Midlothian, VA (US); John V. Facinelli, Morristown, NJ (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/845,889

(22) Filed: Jun. 21, 2022

(65) Prior Publication Data

US 2022/0325044 A1 Oct. 13, 2022

Related U.S. Application Data

(63) Continuation of application No. 16/612,334, filed as application No. PCT/US2018/031619 on May 8, 2018, now Pat. No. 11,396,580.

(60) Provisional application No. 62/504,837, filed on May 11, 2017.

(51) Int. Cl.
| | |
|---|---|
| *C08G 69/14* | (2006.01) |
| *C08G 69/26* | (2006.01) |
| *C08L 77/02* | (2006.01) |
| *C08L 77/06* | (2006.01) |

(52) U.S. Cl.
CPC ............. *C08G 69/26* (2013.01); *C08G 69/14* (2013.01); *C08L 77/02* (2013.01); *C08L 77/06* (2013.01)

(58) Field of Classification Search
CPC .... C08J 2377/06; C08J 2477/06; C08G 69/14
See application file for complete search history.

(56) References Cited

U.S. PATENT DOCUMENTS

| | | | |
|---|---|---|---|
| 3,646,156 A | 2/1972 | Schneider et al. | |
| 3,703,595 A | 11/1972 | Falkenstein et al. | |
| 3,847,877 A | 11/1974 | Nielinger et al. | |
| 4,398,012 A | 8/1983 | Merrill et al. | |
| 4,404,317 A | 9/1983 | Epstein et al. | |
| 4,822,852 A | 4/1989 | Wittmann et al. | |
| 5,288,799 A | 2/1994 | Schmid et al. | |
| 5,416,172 A | 5/1995 | Blondel et al. | |
| 5,684,120 A | 11/1997 | Dalla Torre | |
| 5,886,087 A | 3/1999 | Dalla Torre | |
| 6,277,911 B1 | 8/2001 | Dalla Torre | |
| 6,548,587 B1 | 4/2003 | Bagrodia et al. | |
| 6,916,517 B2 | 7/2005 | Montanari et al. | |
| 7,133,209 B2 | 11/2006 | Wursche et al. | |
| 8,785,590 B2 | 7/2014 | Ishii et al. | |
| 8,932,693 B2 | 1/2015 | Hoffmann et al. | |
| 8,952,103 B2 | 2/2015 | Blondel et al. | |
| 9,012,566 B2 | 4/2015 | Buhler et al. | |
| 9,068,042 B2 | 6/2015 | Stroeks et al. | |
| 9,315,625 B2 | 4/2016 | Rulkens et al. | |
| 11,396,580 B2 * | 7/2022 | Liu | C08L 77/06 |
| 2005/0165210 A1 | 7/2005 | Malet et al. | |
| 2005/0272908 A1 | 12/2005 | Linemann et al. | |
| 2009/0306308 A1 | 12/2009 | Blondel et al. | |
| 2010/0062272 A1 | 3/2010 | Wursche et al. | |
| 2010/0203346 A1 | 8/2010 | Grimes et al. | |
| 2011/0111154 A1 | 5/2011 | Le et al. | |
| 2011/0135860 A1 | 6/2011 | Linemann et al. | |
| 2011/0171408 A1 * | 7/2011 | Saillard | C08G 69/26 |
| | | | 528/329.1 |
| 2012/0172572 A1 | 7/2012 | Ishii et al. | |
| 2014/0134371 A1 * | 5/2014 | Hoffmann | C08G 69/36 |
| | | | 528/346 |
| 2015/0099847 A1 | 4/2015 | Huelsmann et al. | |
| 2016/0369098 A1 | 12/2016 | Yasuda et al. | |
| 2020/0255594 A1 | 8/2020 | Liu et al. | |

FOREIGN PATENT DOCUMENTS

| | | |
|---|---|---|
| CN | 102067014 A | 5/2011 |
| DE | 124190 A1 | 2/1977 |
| EP | 0397767 A1 | 11/1990 |
| EP | 1930373 A2 | 6/2008 |
| WO | 2014/078125 A1 | 5/2014 |
| WO | 2014/198756 A1 | 12/2014 |

OTHER PUBLICATIONS

Dolden, J. G. (1976). Structure-Property Relationships in Amorphous Polyamides. Polymer, 17:875-892.
International Search Report and Written Opinion issued in PCT/US2018/031619, mailed Aug. 7, 2018, 15 pages.
Manunya, Ye, & Iurzhenko, M., ed. (2012). Advances in progressive thermoplastic and thermosetting polymers, perspectives and applications. Research Gate, Editura Tehnopress, open access, 447 pages.
Marchildon, K. (2011). Polyamides—Still Strong After Seventy Years. Macromolecular Reaction Engineering, 5:22-54.
Yoneyama, M., et al. (1988). Preparation and Properties of Aromatic Polyamides and Copolyamides from Phenylindanedicarboxylic Acid and Aromatic Diamines. Journal of Polymer Science, Part A: Polymer Chemistry, 26:2917-2922.

* cited by examiner

*Primary Examiner* — Gregory Listvoyb
(74) *Attorney, Agent, or Firm* — Faegre Drinker Biddle & Reath LLP

(57) ABSTRACT

Amorphous polyamide terpolymers with a high level of transparency, transition glass temperature, flexibility, and chemical resistance. In one embodiment, the polyamide terpolymers are polymerized from caprolactam, at least one diamine, and at least one diacid.

19 Claims, No Drawings

POLYAMIDE TERPOLYMERS FOR MANUFACTURE OF TRANSPARENT ARTICLES

CROSS-REFERENCE TO RELATED APPLICATIONS

This application is a continuation of U.S. application Ser. No. 16/612,334, filed Nov. 8, 2019, which is a 371 National Stage application of International Application No. PCT/US2018/031619, filed May 8, 2018, which claims priority to U.S. Provisional Application No. 62/504,837, filed May 11, 2017, each of which is herein incorporated by reference in its entirety.

FIELD

The present disclosure is generally related to the field of polyamides and articles of manufacture made from polyamides. In particular, the present disclosure is related to amorphous polyamide polymers formed from monomers including caprolactam, at least one diamine, and at least one diacid, and articles of manufacture formed thereof.

BACKGROUND

Polyamides are generally valued for their strength, toughness, and chemical resistance in many engineering applications. However, because of their highly crystalline structure, most polyamides have a translucent milky white or opaque appearance. An opaque appearance limits the use of polyamides in applications where optical transparency is required, such as optical lenses, safety/face shields, water/fuel filter housings, medical components (i.e., breathing masks, tubing), etc.

In some application spaces, alternative clear materials such as polycarbonate (PC), thermoplastic polyurethane (TPU) and poly(methyl methacrylate) (PMMA) have traditionally been used. However, these materials suffer from limited fatigue strength, poor thermal resistance, and/or being prone to environment stress cracking when exposed to common chemical agents such as alcohols, petroleum, and acetone.

More recently, new grades of amorphous or micro-crystalline polyamides with excellent optical transparency have been introduced to the market. However, the large expense of these polyamides has limited their use in many practical applications.

As such, what is needed is an optically transparent polyamide that can be obtained using economical materials and manufacturing methods.

SUMMARY

The present disclosure provides amorphous polyamide terpolymers with a high level of transparency, transition glass temperature, flexibility, and chemical resistance. In one embodiment, the polyamide terpolymers are polymerized from caprolactam, at least one diamine, and at least one diacid.

In one form thereof, the present disclosure provides a polymeric base composition for use in manufacturing a finished article via melt processing, the polymeric base composition including at least one polyamide polymer polymerized from monomers including caprolactam, at least one diamine, and at least one diacid, the polymer having a glass transition temperature of at least 90° C.

The at least one diamine may include at least one diamine selected from the group consisting of 4,4'-methylenebis(2-methylcyclohexylamine) (MACM), 4,4'-methylenebis(cyclohexylamine) (PACM), isophorone diamine, and 2,2-bis (4-aminocyclohexyl)propane, and combinations of the foregoing.

The at least one diacid may include at least one diacid selected from the group of consisting of dodecanedioic acid (C12 diacid), 1,4-cyclohexanedicarboxylic acid (1,4-CHDA), octadecanedioic acid (C18 diacid), and 1,3-cyclohexanedicarboxylic acid, and combinations of the foregoing. The at least one diacid may include two diacids, and the two diacids may be $C_{12}$ diacid and 1,4-CHDA.

The at least one diamine and the at least one diacid may form at least one diacid/diamine monomer of formula [—NHR$_1$NHC(O)R$_2$C(O)—], wherein R$_1$ is one or more substituted or non-substituted non-aromatic cycloalkyl groups and R$_2$ is $C_2$-$C_{18}$ alkyl, including hexyl, octyl, or decyl; or cycloalkyl, including cyclopropyl or cyclohexyl.

The at least one diacid/diamine monomer may be formed of dodecanedioic acid (Cu diacid) and 4,4'-methylenebis(2-methylcyclohexylamine) (MACM), and may have a formula of:

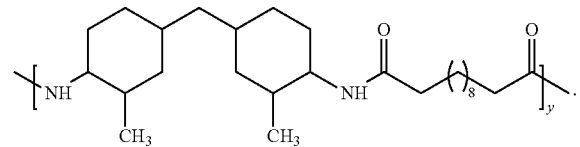

The at least one diacid/diamine monomer may be formed of 1,4-cyclohexanedicarboxylic acid (1,4-CHDA) and 4,4'-methylenebis(2-methylcyclohexylamine) (MACM), and may have a formula of:

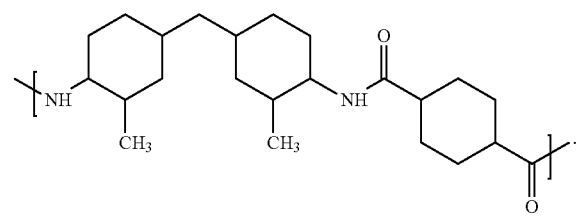

In the polymeric base composition, at least two diacid/diamine monomers may be formed. The two diacid/diamine monomers may have a formula of:

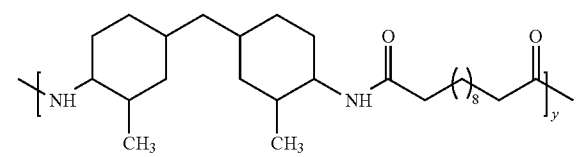

formed of dodecanedioic acid ($C_{12}$ diacid) and 4,4'-methylenebis(2-methylcyclohexylamine) (MACM) and a formula of:

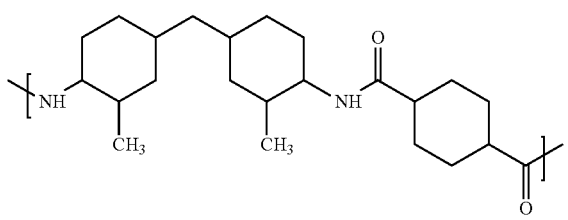

formed of 1,4-cyclohexanedicarboxylic acid (1,4-CHDA) and 4,4'-methylenebis(2-methylcyclohexylamine) (MACM).

The polyamide polymer may have a glass transition temperature, measured by Differential Scanning calorimetry (DSC) according to ASTM D3418 of between 90° C. and 165° C.

The polyamide polymer may have a transparency, measured by one of a hazemeter and a spectrophotometer according to ASTM D1003, of at least 85%.

The polyamide polymer may include between 30 mol. % and 70 mol. % monomers based on caprolactam and between 30 mol. % and 70 mol. % monomers based on the at least one diacid and the at least one diamine.

The polyamide polymer may include less than 5 mol. % of aromatic groups, based on the total moles of the monomer components of the polymer.

In another form thereof, the present disclosure provides an article of manufacture including a finished article formed from at least one polyamide polymer polymerized from monomers including caprolactam, at least one diamine, and at least one diacid; and wherein the article has a glass transition temperature, measured by Differential Scanning calorimetry (DSC) according to ASTM D3418, equal to or greater than 140° C. and the polyamide polymer includes less than 5 mol. % of aromatic groups, based on the total moles of the monomer components of the polymer.

The polyamide polymer may have a transparency, measured by one of a hazemeter and a spectrophotometer according to ASTM D1003, of at least 85%.

The article may have a water absorption at equilibrium, according to ASTM D570, of less than 3.5%.

The finished article may have a burst pressure, measured according to ASTM D790, between 1200 MPa and 2500 MPa.

The polyamide polymer may include between 30 mol. % and 70 mol. % monomers based on caprolactam and between 30 mol. % and 70 mol. % monomers based on the at least one diacid and the at least one diamine.

The finished article may be selected from the group consisting of an optical lens, a safety/face shield, a water/fuel filter housing, and a medical component.

DETAILED DESCRIPTION

The present disclosure relates to polymeric base compositions useful for a variety of applications including for the manufacture of transparent articles. The polymeric base composition may include a polyamide terpolymer synthesized from monomers including caprolactam, at least one diamine, and at least one diacid. The diacid and diamine monomers typically together form a diacid/diamine monomer provided in a 1:1 molar proportion of diacid and diamine, which may be either in solid form or in the form of an aqueous solution.

I. Preparation of Polyamide Terpolymers.

Caprolactam is traditionally used to form polyamide 6 via ring opening hydrolysis, followed by step growth polymerization. According to the present disclosure, monomers of caprolactam, at least one diamine, and at least one diacid are polymerized together to produce amorphous polyamide terpolymers including caprolactam monomers, diacid monomers, and diamine monomers. Alternatively conceptualized, the present polyamide polymers may be considered to include a first component of monomers, or monomer component, based on caprolactam and a second component of monomers, or monomer component, based on at least one diacid/diamine pair.

As discussed further below, in the present polyamide polymers, the polymer chains include monomers, or repeating units, based on caprolactam, and monomers, or repeating units, based on at least one diacid/diamine pair which are mutually present in the polymer chains according to a random or near random distribution. Advantageously, as discussed further below, the terpolymers of the present disclosure are highly transparent (having a light transmittance ≥90%, for example) and have high glass transition temperatures (≥140° C., for example).

As discussed further below, the diacid monomers may be in the form of an aliphatic diacid or a cycloaliphatic diacid, for example.

In the present polyamide polymers, the caprolactam monomers may be present in an amount as little as 25 mol. %, 30 mol. %, 40 mol. %, or 50 mol. %, or as great as 60 mol. %, 70 mol. %, 80 mol. %, or 90 mol. % of the total moles of caprolactam and diamine/diacid monomers, or within any range defined between any two of the foregoing values, such as 25 mol. % to 90 mol. %, 35 mol. % to 80 mol. %, or 50 mol. % to 80 mol. %, for example.

In the present polyamide polymers, the total diamine/aliphatic acid monomers may be present in an amount as little as 5 mol. %, 9 mol. %, 10 mol. %, 15 mol. % or as great as 20 mol. %, 25 mol. %, 30 mol. %, or 35 mol. %, of the total moles of caprolactam and diacid/diamine monomers, or within any range defined between any two of the foregoing values, such as 5 mol. % to 35 mol. %, or 9 mol. % to 30 mol. %, for example.

In the present polyamide polymers, the total diamine/cycloaliphatic diacid monomers may be present in an amount as little as 10 mol. %, 15 mol. %, or 20 mol. %, as great as 25 mol. %, 30 mol. %, 40 mol. %, or 45 mol. %, of the total moles of caprolactam and diacid/diamine monomers, or within any range defined between any two of the foregoing values, such as 10 mol. % to 45 mol. %, 15 mol. % to 40 mol. %, 20 mol. % to 30 mol. %, or 20 mol. % to 25 mol. %, for example.

Suitable diacids for the diacid/diamine monomer(s) generally include diacids of the general formula:

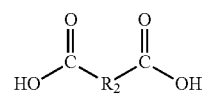

Wherein $R_2$ is $C_2$-$C_{18}$ alkyl, including for example hexyl, octyl, or decyl; or cycloalkyl, including for example cyclopropyl or cyclohexyl. For example, the diacid(s) may include octadecanedioic acid ($C_{18}$ diacid), 1,3-cyclohexanedicarboxylic acid, dodecanedioic acid ($C_{12}$ diacid), and/or 1,4-cyclohexanedicarboxylic acid (1,4-CHDA).

Suitable diamines for the diacid/diamine monomer(s) generally include diamines of the general formula:

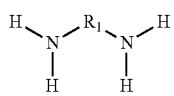

Wherein $R_1$ is one or more substituted or non-substituted non-aromatic cycloalkyl groups. For example, the diamine(s) may include 4,4'-methylenebis(2-methylcyclohexylamine) (MACM), 4,4'-methylenebis(cyclohexylamine) (PACM), isophorone diamine, or 2, 2-bis(4-aminocyclohexyl)propane.

In one particular exemplary embodiment, the polyamide polymer includes a caprolactam monomer of formula:

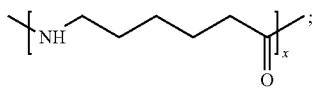

a first diacid/diamine repeat unit of formula:

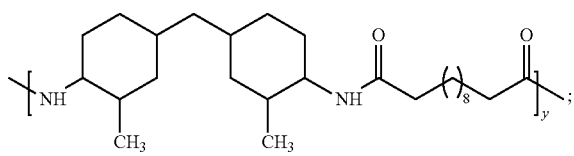

and a second diacid/diamine repeat unit of formula:

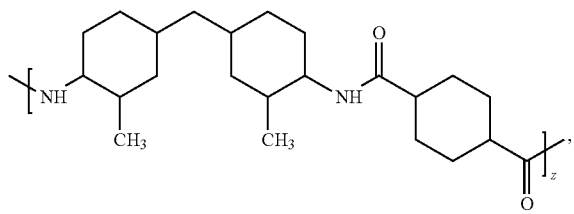

wherein X is between 40 and 80, Y is between 5 and 30, and Z is between 15 and 30.

In various further embodiments, X is 50, Y is 25, and Z is 25, while in other embodiments, X is 70, Y is 9, and Z is 21.

The first diacid/diamine monomer shown above is a monomer of dodecanedioic acid ($C_{12}$ diacid) and 4,4'-methylenebis(2-methylcyclohexylamine) (MACM), while the second diacid/diamine monomer shown above is a monomer of 1,4-cyclohexanedicarboxylic acid (1,4-CHDA) and 4,4'-methylenebis(2-methylcyclohexylamine) (MACM).

The reaction mixture used to form the present polyamide polymers and/or the polyamide base compositions themselves may further include other additives such as chain regulators, catalysts, defoaming agents, and other suitable additives.

Suitable chain regulators include acetic acid, benzoic acid, cyclohexamine, stearylamine, and mixtures thereof. The chain regulators may be present in an amount of as little as 0.001 wt. %, 0.005 wt. %, or 0.05 wt. %, or as great as 0.1 wt. %, 0.5 wt. %, or 1.0 wt. %, or within any range defined between any two of the foregoing values, such as 0.001 to 1.0 wt. %, 0.005 to 0.5 wt. %, or 0.05 to 0.1 wt. %, based on the total weight of the polyamide polymer.

Suitable catalysts include phosphoric acids or derivatives thereof (e.g., hypophosphoric acid, sodium hypophosphite). Exemplary ranges in which a catalyst may be added include 10-1000 ppm, or more preferably 30-100 ppm, based on the total weight of the polyamide polymer.

Suitable defoaming agents for preventing foam formation in the reactor headspace include aqueous emulsions of ethylene oxide and propylene oxide derivatives or silicones. Example ranges in which a defoaming agent may be added include 0.01 wt. % to 1 wt. %, or more preferably 0.01 wt. % to 0.1 wt. %, based on the total weight of the polyamide polymer.

Nucleating agents, however, when present in the reactant composition and/or in the polymer base composition, tend to promote a more crystalline structure when the present polymers are melt processed, as opposed to a more desirable amorphous or non-crystalline structure. As such, the presently disclosed polymers are generally nucleating agent free to prevent or minimize recrystallization of the polymer after melt processing. As used herein, "nucleating agent free" refers to polymeric base compositions which include a total of less than 1 wt. % of any nucleating agents present, based on the total weight of the polymer base composition or, alternatively, 0 wt. % or no detectable amount of any nucleating agents based on the total weight of the polymer base composition.

To form the present amorphous polyamide polymers, caprolactam, at least one diacid, and at least one diamine are blended together and mixed with water to form a slurry. The reaction mixture is then heated in a vessel to a temperature that can be as low as 240° C., or as high as 300° C., or more specifically between 260° C. and 280° C. The heating step may also be carried out in a single step, or multiple steps. For example, the reaction mixture may be heated for a given period of time at a single temperature, or the reaction mixture may be heated for a first period of time at a first temperature and a second period of time at a second temperature.

Before, during or after the reaction mixture is heated, the reaction mixture is stirred for a given period of time, where the rate of stirring is between approximately 5 rpm and 100 rpm, and more specifically between 10 rpm and 60 rpm, and the given time period is as short as 0.25 hours, 0.5 hours, or 1 hour, or as long as 2 hours, 3 hours, 4 hours, or 5 hours, or within any range defined between any two of the foregoing values, such as between 0.25 hours and 5 hours, between 0.5 hours and 5 hours, between 0.25 hours and 2 hours, between 1 hour and 3 hours, or between 0.5 hours and 1 hour, for example.

In various embodiments, the stirring rate may remain constant for the entire given period of time, or the stirring rate may change or vary as desired during the reaction. For example, the stirring rate can remain at a first rate for the entire time period, or the stirring rate can be held at the first rate for a first portion of the time period and then changed to a second rate for a second portion of the time period. Additionally, the reaction mixture may be stirred for the same amount of time as it is heated, or for less or more than the amount of time it is heated. In some embodiments, the reaction mixture is stirred at a rate between 30-100 rpm, and more preferably 40-60 rpm for approximately 0.5 to 5 hours, or more preferably approximately 1 to 3 hours, when the reaction mixture is pressurized during polymerization, and at a rate of between 5-30 rpm, and more preferably 10-15 rpm, when the reaction mixture is depressurized and degassed during polymerization, the reaction mixture being stirred for approximately 0.25 to 2 hours, or more preferably approximately 0.5 to 1 hour when depressurized, and approximately 0.5 to 5 hours, or more preferably approximately 1 to 3 hours when degassed.

Furthermore, during the heating and/or stirring of the reaction mixture, the reaction mixture may be vented such that the vessel pressure is held at or below a specific pressure between approximately 50 psi and 300 psi during the given time period. In various embodiments, the vessel pressure may be held at the specific pressure for more or less than the given time period. Additionally, the specific pressure may be held at a constant or within a given range, for example between 250 psi and 300 psi or between 0 psi and 5 psi, or the specific pressure may change for various time frames during the given time period. For example, the vessel pressure may be held at a first pressure, or a range inclusive thereof, for the entire time period, or the vessel pressure may be held at the first pressure for a first portion of the time period and then changed to a second vessel pressure for a second portion of the time period. In some embodiments, the pressure of the reaction mixture during polymerization may be held around the upper limit of 300 psi, then reduced to approximately 14.7 psi, or atmospheric pressure during depressurization, and then held between 0 to 5 psi during the nitrogen sweep or degassing.

The reaction mixture may also be swept with nitrogen for a period of time before, during, or after the heating, stirring, and/or pressurization of the mixture. Once the reaction mixture reaches a certain molecular weight range, the molten polymer is extruded by gravity, a nitrogen pad, and/or the aid of a melt pump into a single strand or multiple strands, quenched with ice water, and pelletized.

In one particular embodiment, the slurry is formed of a mixture of caprolactam, two diacids, and one diamine. The slurry is placed in a vessel, which is completely sealed. The sealed vessel is slowly heated to 120° C., and then to 280° C. with stirring at approximately 40 rpm over a two-hour period. During this two-hour period, steam is continuously vented to maintain the vessel pressure below or at 180 psi. After the two-hour period, the pressure is reduced to 5 psi in approximately 15 minutes, the stirring speed is reduced to 10 rpm, and then a nitrogen sweep is applied and held for approximately 30 minutes. The molten polymer is then extruded by gravity into a single strand, quenched with ice water, and pelletized. The mixture of caprolactam, diamine(s), and diacid(s) and optionally water, is polymerized to form the polymeric base composition. The polymerization may be carried out using a batch reactor, a batch continuously stirred tank reactor (CSTR), or by using a continuous polymerization train, for example.

The resulting polymers are typically wholly aliphatic or aromatic-free. As used herein, "aromatic-free" or "wholly aliphatic" refers to polymers which include less than 5 mol. % of aromatic groups on the polymer chains, less than 3 mol. % of aromatic groups on the polymer chains, less than 1 mol. % of aromatic groups on the polymer chains or, still alternatively, 0 mol. % of aromatic groups on the polymer chains, based on the total moles of the monomer components of the polymer.

II. Properties of the Polyamide 6 Terpolymers and Articles Made Therefrom.

The present polyamide polymers and/or articles of manufacture made therefrom may have a relatively high transparency as measured by a hazemeter or spectrophotometer according to ASTM D1003 compared to alternative clear materials (i.e., polycarbonate (PC), thermoplastic polyurethane (TPU), poly(methyl methacrylate) (PMMA), etc.). For example, the measured transparency of the present polymers, as determined according to ASTM D1003, may be at least 80%, at least 85%, at least 90%, or at least 95%, for example.

The present polyamide polymers and/or articles of manufacture made therefrom have a relatively high glass transition temperature as measured by Differential Scanning calorimetry (DSC) according to ASTM D3418 compared to alternative clear materials. In particular, the present polyamide polymers and/or articles of manufacture made therefrom may have a glass transition temperature, as determined by Differential Scanning calorimetry (DSC) according to ASTM D3418, of as little as 90° C., 95° C., or 100° C., or as great as 140° C., 150° C., or 160° C., or within any range defined between any two of the foregoing values, such as 90° C. to 160° C., 95° C. to 150° C., or 100° C. to 140° C., for example.

The present polyamide polymers and/or articles of manufacture made therefrom have relatively low water absorption at equilibrium as measured using ASTM D570 compared to alternative clear materials. In particular, the present polyamide polymers and/or articles of manufacture made therefrom may have water absorption at equilibrium according to ASTM D570 of less than 7.5%, less than 6.5%, less than 5.5%, less than 4.5%, or less than 3.5%, for example.

The present polyamide polymers and/or articles of manufacture made therefrom may also have a relatively high resistance to chemicals such as alcohol, acetone, petroleum, etc. as measured using ASTM D543 compared to alternative clear materials. In particular, the present polyamide polymers and/or articles of manufacture made therefrom may exhibit no fractures or cracks as determined according to ASTM D543 when exposed to the various chemicals.

Transparent molded articles may be prepared from the present polyamide polymers via injection molding at an elevated temperature for a desired cycle time. In some embodiments, the temperature may be as low as 240° C., or as high as 300° C., or more specifically, between 260° C. and 290° C., and the cycle time may be as low as 30 seconds, or as high as 120 seconds, or more specifically around 60 seconds, for example.

Transparent specimens of the present polyamide polymers may be tested in the form of "dry as molded" (DAM), or after being conditioned at a given temperature and 50±5% relative humidity (RH) for a period of time. Specifically, the transparent specimens may be conditioned according to ASTM D618-13, where the period of time for conditioning can be as low as 46 hours, or as high as 50 hours, or more specifically around 48 hours, and the temperature at which the specimens are conditioned may be as low as 21° C., or as high as 25° C., or more specifically around 23° C.

The transparent molded articles and/or articles of manufacture made from the present polyamide polymers may have comparable or better tensile properties, such as elastic modulus, stress at yield, tensile strength, percent elongation at yield, and percent elongation at break, as measured using ASTM D638-14, as compared to semi-crystalline polyamide 6 homopolyers and/or an epsilon-caprolactam copolymers. In some embodiments, the elastic modulus of the transparent articles formed from the present polyamides may be comparable to that of semi-crystalline polyamide 6 homopolymer or an epsilon-caprolactam copolymer, and as low as 1500 MPa, or 1600 MPa, or as high as 1700 MPa, or 1850 MPa, or within any range defined between any two of the foregoing values, such as between 1500 MPa and 1850 MPa, or between 1600 MPa and 1700 MPa, for example.

Furthermore, the stress at yield of transparent articles made from the present polyamide polymers may be higher than that of semi-crystalline polyamide 6 homopolymers or an epsilon-caprolactam copolymers, and may be as low as 70 MPa, or 75 MPa, or as high as 80 MPa, or 85 MPa, or within any range defined between any two of the foregoing values, such as between 70 MPa and 85 MPa, or between 70 MPa and 80 MPa, for example.

In addition, the tensile strength of transparent articles made from the present polyamide polymers may be as low as 70 MPa, or 75 MPa, or as high as 80 MPa, or 85 MPa, or within any range defined between any two of the foregoing values, such as between 70 MPa and 85 MPa, or between 70 MPa and 80 MPa, according to ASTM D638-14.

Additionally, transparent molded articles and/or articles of manufacture made from the present polyamide polymers may have comparable or better flexural properties, such as flexural modulus, flexural strength, flexural strength at 5% strain, and strain at maximum stress, as measured using ASTM D790-15, as compared to polyamide 6 homopolymers and an epsilon-caprolactam copolymers. In some embodiments, the flexural modulus of eyewear frames, for example, made from the present polyamide polymers may be in the range of 1600 to 2000 MPa, or more specifically 1800-2000 MPa.

The flexural modulus of the transparent articles made from the present polyamide polymers, as determined according to ASTM D790-15, may be as low as 2000 MPa, or 2100 MPa, or as high as 2200 MPa, or 2500 MPa, or within any range defined between any two of the foregoing values, such as between 2000 MPa and 2500 MPa, or between 2100 MPa and 2500 MPa, for example.

The flexural strength of the transparent articles made from the present polyamide polymers, as determined according to ASTM D790-15, may be as low as 90 MPa, or 100 MPa, or as high as 110 MPa, 120 MPa, or 130 MPa, or within any range defined between any two of the foregoing values, such as between 90 MPa and 130 MPa, or between 100 MPa and 120 MPa, for example.

The flexural strength at 5% strain of the transparent articles made from the present polyamide polymers, as determined according to ASTM D790-15, may be as low as 80 MPa, or 90 MPa, or as high as 95 MPa, or 100 MPa, or within any range defined between any two of the foregoing values, such as between 80 MPa and 100 MPa, or between 80 MPa and 95 MPa, for example.

Transparent molded articles and/or articles of manufacture made from polyamide polymers may have lower densities as measured using a water displacement method in accordance with ASTM D792-13 as compared to polyamide 6 homopolymers (1.13 g/cm$^3$), polycarbonate (1.2 g/cm$^3$), and polymethyl methacrylate (PMMA) (1.19 g/cm$^3$). In some embodiments, the density of the transparent articles made from the present polyamide polymers, as determined according to ASTM D792-13, may be as low as 1.00 g/cm$^3$, or 1.05 g/cm$^3$, or as high as 1.10 g/cm$^3$, 1.12 g/cm$^3$, or 1.20 g/cm$^3$, or within any range defined between any two of the foregoing values, such as between 1.0 g/cm$^3$ and 1.20 g/cm$^3$, or between 1.00 g/cm$^3$ and 1.12 g/cm$^3$, for example. The lower density of the transparent molded articles and/or articles of manufacture made from polyamide polymers allows the articles to be lighter in total weight than other materials.

Furthermore, transparent molded articles and/or articles of manufacture made from the present polyamide polymers may have higher zero-shear melt viscosities as measured by a Dynisco LCR-7000 capillary rheometer at 280° C. across the shear rate range 100-10,000 S, in accordance with ASTM D3835-16, as compared to polyamide 6 homopolymers. In some embodiments, the zero-shear melt velocity of the transparent articles may be as low as 100 Pa-s, 200 Pa-s, or 300 Pa-s, or as high as 600 Pa-s, 800 Pa-s, or 1000 Pa-s, or within any range defined between any two of the foregoing values, such as between 100 Pa-s and 1000 Pa-s, or between 300 Pa-s and 600 Pa-s, for example.

In addition, dilute solution viscosities of transparent molded articles and/or articles of manufacture made from the present polyamide polymers may be tailored by polymerization extent and/or the amount of chain regulator such that the dilute solution viscosities as measured on solutions in 0.5 wt. % m-cresol at 25° C., in accordance with ISO 307:2007(E), may be as low as 1.50, or 1.60, or as high as 1.70, 1.90, or 2.00, or within any range defined between any two of the foregoing values, such as between 1.50 and 2.00, or between 1.50 and 1.70, for example. The dilute solution viscosities of the transparent articles can be adjusted by using a low excess of diamines or dicarboxylic acids, for example 0.1-1 mol. %, of a chain regulator of the type discussed above.

Transparent molded articles and/or articles of manufacture made from the present polyamide polymers may have lower moisture and water absorption as measured on DAM disk samples with a thickness of ⅛ inch and a diameter of 1.5 inches, according to ASTM D570, as compared to polyamide 6 homopolymers and epsilon-caprolactam copolymers. In some embodiments, the water content percentage of the transparent articles may be as low as 0.6%, 0.8%, or 1.0%, or as high as 2.5%, 3.5%, or 4%, or within any range defined between any two of the foregoing values, such as between 0.6% and 4%, 0.6% and 1.0%, 1.0% and 2.5%, or 2.5% and 4%, for example. Additionally, in some embodiments, the moisture content percentage of the transparent articles may be as low as 0.2% or 0.4%, or as high as 0.7%, 0.8%, 1.1%, or 1.3%, or within any range defined between any two of the foregoing values, such as between 0.2% and 1.3%, between 0.2% and 0.4%, between 0.7% and 1.1%, between 1.1% and 1.3%, for example.

Furthermore, transparent molded articles and/or articles of manufacture made from the present polyamide polymers may have better environmental stress cracking resistance as measured by fixing the transparent article to a strain jig with a defined outer fiber bending radius, and submerging the transparent article into a solvent/chemical for a period of time at a designated temperature, as adapted from the bend strip test of ASTM D543-14, as compared to nylon 6 and an epsilon-caprolactam copolymer. In particular, the transparent articles of the present disclosure are environmental stress cracking resistance to acetone and hexane at 0%, 1%, and 2% outer fiber strains.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

EXAMPLES

Exemplary formulations were tested using differential scanning calorimetry to determine glass transition temperature ($T_g$) in accordance with ASTM D3418 and a hazemeter or spectrophotometer to determine transmittance in accordance with ASTM D1003.

Examples 1-12

Examples 1-12 were prepared using a polymer composition rapid screening method. In particular, the monomer components (caprolactam, dicarboxylic acids and cycloaliphatic diamines) of the ratios specified below in Table 1, 3 mol % excess of diamine, and 300 ppm of hypophosphorous acid solution were weighed in a test tube and mixed with 40 wt. % of water to form a slurry. Five test tubes were placed into a 600 mL Parr reactor equipped with a tube rack, which was then sealed and swept with nitrogen.

The melt polymerization of each example was performed in three stages involving pressurization, depressurization and polycondensation. The temperature and pressure were monitored with a thermocouple in the center of the tube rack and an overhead pressure gauge, respectively. The temperature was first maintained at 120° C. to homogenize the mixture within each composition system. Then the heater set point was increased to 260-280° C. In order to mitigate the loss of diamine and other volatile components, the pressure was allowed to reach a maximum of 300 psi. When the reaction temperature stabilized at set point, the system was slowly vented to atmospheric pressure in a period of 15 minutes. Then a nitrogen purge was regulated at 5 psi into the vessel for 2 hours. The resulting 5 different nylon polymers for each example were retrieved and examined visually.

TABLE 1

$T_g$ and Transparency of compositions having varying levels of monomers

| Ref. No. | Mol. % Caprolactam | Mol. % 1$^{st}$ Diacid | Mol. % 2$^{nd}$ Diacid | Mol. % Diamine | $T_g$ (° C.) | Transparency |
|---|---|---|---|---|---|---|
| Ex 1 | 60.0 | 20.0 | — | 20.0 | 166.0 | Opaque/Brittle |
| Ex 2 | 50.0 | 25.0 | — | 25.0 | 174.0 | Opaque/Brittle |
| Ex 3 | 33.3 | 16.7 | 16.7 | 33.3 | 132.0 | Translucent |
| Ex 4 | 33.3 | 16.7 | 16.7 | 33.3 | 155.8 | Transparent |
| Ex 5 | 33.3 | 16.7 | 16.7 | 33.3 | 147.5 | Transparent |
| Ex 6 | 66.7 | 8.3 | 8.3 | 16.7 | 95.7 | Transparent |
| Ex 7 | 66.7 | 5.0 | 11.7 | 16.7 | 100.5 | Translucent |
| Ex 8 | 42.9 | 14.3 | 14.3 | 28.6 | 137.2 | Transparent |
| Ex 9 | 53.8 | 7.0 | 16.2 | 23.1 | 140.6 | Transparent |
| Ex 10 | 33.3 | 10.0 | 23.3 | 33.3 | 161.0 | Translucent |
| Ex 10 | 33.3 | 23.3 | 10 | 33.3 | 137.4 | Transparent |
| Ex 12 | 42.9 | 17.1 | 11.4 | 28.6 | 148.5 | Transparent |

Examples 4 and 9 were subsequently scaled up according to Examples 13 and 14 below, and further investigated by differential scanning calorimetry, thermogravimetric analysis, and dynamic mechanical analysis (on a film strip), and compared to nylon 6 (hereinafter "Comparison Example 1"), an epsilon-caprolactam copolymer (hereinafter "Comparison Example 2"), and/or polycarbonate (hereinafter "Comparison Example 3") (see Tables 2-6).

Example 13

A 2 Liter Parr reactor was charged with 135.8 grams of caprolactam, 139.6 grams of dodecanedioic C12 diacid (99%), 104.4 grams of 1,4-Cyclohexanedicarboxylic acid (1,4 CHDA, 99%), 289.0 grams of 4,4'-Methylenebis(2-methylcyclohexylamine) (MACM, 99%) and 400 mL of deionized water. The vessel was completely sealed and slowly heated to 120° C., and then to 280° C. with stirring (~40 rpm) over a 2-hour period. Steam was continuously vented to maintain the reactor pressure below or at 180 psi. The pressure was then reduced to 5 psi in 15 minutes, the agitator speed was reduced to 10 rpm, and then a nitrogen sweep was applied and held for approximately 30 minutes. The molten polymer was extruded by gravity into a single strand, quenched with ice water and pelletized. The pellets were washed in boiling water for 1 hour three times, and vacuum dried at 80° C. for 24 hours to a water content below 0.08%.

The glass transition temperature for the formed polymer was 155° C., and the transmittance of the formed polymer was 92.4%.

Example 14

A 2 Liter Parr reactor was charged with 237.6 grams of caprolactam, 62.81 grams of C12 diacid (99%), 109.6 grams of 1,4 CHDA (99%), 216.7 grams of MACM (99%) and 400 mL of deionized water. The vessel was completely sealed and slowly heated to 120° C., and then to 280° C. with stirring (~40 rpm) over a 2-hour period. Steam was continuously vented to maintain the reactor pressure below/at 180 psi. The pressure was then reduced to 5 psi in 15 minutes, the agitator speed was reduced to 10 rpm, and then a nitrogen sweep was applied and held for approximately 30 minutes. The molten polymer was extruded by gravity into a single strand, quenched with ice water, and pelletized. The pellets were washed in boiling water for 1 hour 3 times, and vacuum dried at 80° C. for 24 h to a water content below 0.08%. The glass transition temperature for the formed polymer was 140° C., and the transmittance of the formed polymer was 92.7%.

TABLE 2

Tensile Properties of Transparent Articles of the Present Disclosure in Comparison to Comparison Examples 1 and 2

| Tensile | | | Comparison Example 1 | Comparison Example 2 | Example 13 | Example 14 |
|---|---|---|---|---|---|---|
| DAM | Modulus | MPa | 1881 | 1733 | 1618 | 1708 |
| | Stress @ Yield | MPa | 73.8 | 73.4 | 70.7 | 84.0 |
| | Tensile Strength | MPa | 103.4 | 73.4 | 70.6 | 84.0 |
| Conditioned 23° C., 48 h | Modulus | MPa | 1626 | 1419 | 1560 | 1824 |
| | Stress @ Yield | MPa | 58.9 | 57.6 | 71.0 | 78.4 |
| | Tensile Strength | MPa | 78.5 | 77.1 | 71.0 | 78.4 |

TABLE 3

Flexural Properties of Transparent Articles of the Present Disclosure in Comparison to Comparison Examples 1 and 2

| Flexural | | | Comparison Example 1 | Comparison Example 2 | Example 13 | Example 14 |
|---|---|---|---|---|---|---|
| DAM | Flexural Modulus | MPa | 2937 | 2457 | 2198 | 2421 |
| | Flexural Strength @ 5% Strain | MPa | 111.3 | 95.9 | 95.0 | 106.6 |
| | Flexural Strength | MPa | 112.8 | 95.9 | 111.0 | 120.0 |
| Conditioned 23° C., 48 h | Flexural Modulus | MPa | 1915 | 1632 | 2060 | 2147 |
| | Flexural Strength @ 5% Strain | MPa | 80.5 | 69.7 | 84.8 | 90.9 |
| | Flexural Strength | MPa | 87.8 | 72.0 | >99.9 | >106.1 |

TABLE 4

Density, Zero-Shear Melt Viscosity and Relative Solution Viscosity of the Transparent Articles of the Present Disclosure in Comparison to Comparison Example 1

| | | Comparison Example 1 | Example 13 | Example 14 |
|---|---|---|---|---|
| Density (ASTM D792) | g/cm$^3$ | 1.13 | 1.04 | 1.06 |
| Zero-shear melt viscosity (capillary at 280° C.) | Pa-s | 153 | 454 | 346 |
| Relative Solution Viscosity (ISO 307) | in 0.5% m-cresol | — | 1.56 | 1.62 |

TABLE 5

Environmental Stress Cracking of the Transparent Articles of the Present Disclosure in Comparison to Comparison Examples 2 and 3

| | | | Comparison Ex. 3 Outer Fiber Strain | | | Comparison Ex. 2 Outer Fiber Strain | | | Example 13 Outer Fiber Strain | | | Example 14 Outer Fiber Strain | | |
|---|---|---|---|---|---|---|---|---|---|---|---|---|---|---|
| Medium | Temp. (° C.) | Time (hrs) | 0% | 1% | 2% | 0% | 1% | 2% | 0% | 1% | 2% | 0% | 1% | 2% |
| Acetone | 23 | 24 | (3) | − (1) (3) | − (1) (3) | (3) | − (1) (3) | − (1) (3) | + | + | + | + | + | − (1) |
| Isopropyl alcohol | 23 | 24 | + | − (1) | − (1) | + | + | − (3) | + | − (1) | − (1) | + | − (1) | − (1) |
| Hexane | 23 | 24 | + | − (1) | − (1) | + | + | + | + | + | + | + | + | + |

+ = Resistant, no stress cracks detected
− = Not resistant
(1) = Stress cracks detected
(2) = Dissolves
(3) = Surface turns cloudy, discoloration

TABLE 6

Water and Moisture Content Percentage of the Transparent Articles of the Present Disclosure in Comparison to Comparison Examples 1 and 2

| | | Comparison Example 1 | Comparison Example 2 | Example 13 | Example 14 |
|---|---|---|---|---|---|
| Moisture content % 23° C., 50% RH | 24 hr | 0.38 | 0.42 | 0.28 | 0.34 |
| | 7 days | 0.89 | 1.04 | 0.74 | 0.84 |
| | 15 days | 1.21 | 1.43 | 1.08 | 1.21 |
| Water content % 23° C., water immersion | 24 hr | 2.54 | 2.12 | 0.68 | 1.00 |
| | 7 days | 5.66 | 4.98 | 1.78 | 2.41 |
| | 15 days | 8.05 | 7.03 | 2.66 | 3.61 |

While this disclosure has been described as relative to exemplary designs, the present disclosure may be further modified within the spirit and scope of this disclosure. Further, this application is intended to cover such departures from the present disclosure as come within known or customary practice in the art to which this disclosure pertains.

The invention claimed is:

1. A polymeric base composition for use in manufacturing a finished article via melt processing, the polymeric base composition comprising at least one polyamide polymer polymerized from monomers including caprolactam, at least one diamine, and at least two diacids, wherein the polymer has a glass transition temperature of at least 140° C., as measured by Differential Scanning calorimetry (DSC) according to ASTM D3418.

2. The polymeric base composition of claim 1, wherein the at least one diamine includes at least one diamine selected from the group consisting of 4,4'-methylenebis(2-methylcyclohexylamine) (MACM), 4,4'-methylenebis(cyclohexylamine) (PACM), isophorone diamine, and 2,2-bis (4-aminocyclohexyl) propane, and combinations of the foregoing.

3. The polymeric base composition of claim 2, wherein the at least one diamine is MACM.

4. The polymeric base composition of claim 1, wherein the at least one diacid includes at least one diacid selected from the group of consisting of dodecanedioic acid (C12 diacid), 1,4-cyclohexanedicarboxylic acid (1,4-CHDA), octadecanedioic acid (C18 diacid), and 1,3-cyclohexanedicarboxylic acid, and combinations of the foregoing.

5. The polymeric base composition of claim 4, wherein the at least two diacids are C12 diacid and 1,4-CHDA.

6. The polymeric base composition of claim 1, wherein the at least one diamine and the at least one diacid form at least one diacid/diamine monomer of formula [—NHR1NHC(O)R2C(O)—], wherein R1 is one or more substituted or non-substituted non-aromatic cycloalkyl groups and R2 is C2-C18 alkyl, including hexyl, octyl, or decyl; or cycloalkyl, including cyclopropyl or cyclohexyl.

7. The polymeric base composition of claim 6, wherein the at least one diacid/diamine monomer is formed of dodecanedioic acid (C12 diacid) and 4, 4'-methylenebis(2-methylcyclohexylamine) (MACM), and has a formula of:

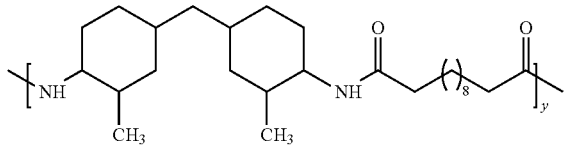

wherein y is between 5 and 30.

8. The polymeric base composition of claim 6, wherein the at least one diacid/diamine monomer is formed of 1,4-cyclohexanedicarboxylic acid (1,4-CHDA) and 4, 4'-methylenebis(2-methylcyclohexylamine) (MACM), and has a formula of:

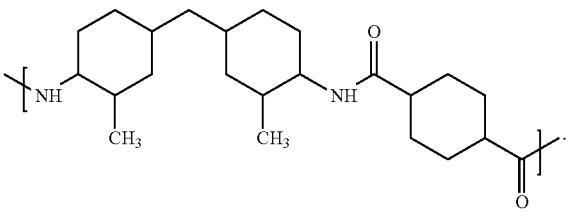

9. The polymeric base composition of claim 6, wherein at least two diacid/diamine monomers are formed.

10. The polymeric base composition of claim 9, wherein the two diacid/diamine monomers have a formula of:

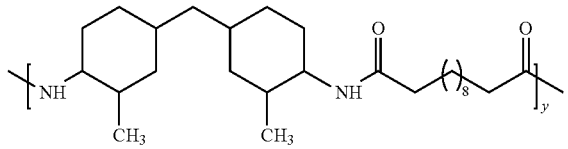

wherein y is between 5 and 30, formed of dodecanedioic acid (C12 diacid) and 4, 4'-methylenebis(2-methylcyclohexylamine) (MACM) and a formula of:

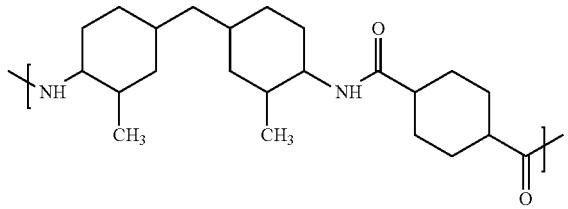

formed of 1,4-cyclohexanedicarboxylic acid (1,4-CHDA) and 4, 4'-methylenebis(2-methylcyclohexylamine) (MACM).

11. The polymeric base composition of claim 1, wherein the polymer has a dry as molded (DAM) flexural modulus of at least 2000 MPa as determined by ASTM D790-15.

12. The polymeric base composition of claim 1, wherein the polyamide polymer has a transparency, measured by one of a hazemeter and a spectrophotometer according to ASTM D1003, of at least 85%.

13. The polymeric base composition of claim 1, wherein the polyamide polymer includes between 30 mol. % and 70 mol. % monomers based on caprolactam and between 30 mol. % and 70 mol. % monomers based on the at least one diacid and the at least one diamine.

14. The polymeric base composition of claim 1, wherein the polyamide polymer includes less than 5 mol. % of aromatic groups, based on the total moles of the monomer components of the polymer.

15. An article of manufacture comprising a finished article formed from at least one polyamide polymer polymerized from monomers including caprolactam, at least one diamine, and at least two diacids, wherein the polymer has a glass transition temperature of at least 140° C., as measured by Differential Scanning calorimetry (DSC) according to ASTM D3418.

16. The article of manufacture of claim 15, wherein the article has a water absorption at equilibrium, according to ASTM D570, of less than 3.5%.

17. The article of manufacture of claim 15, wherein the finished article has a burst pressure, measured according to ASTM D790, between 1200 MPa and 2500 MPa.

18. The article of manufacture of claim 15, wherein the polyamide polymer includes between 30 mol. % and 70 mol. % monomers based on caprolactam and between 30 mol. % and 70 mol. % monomers based on the at least one diacid and the at least one diamine.

19. The article of manufacture of claim 15, wherein the finished article is selected from the group consisting of an optical lens, a safety/face shield, a water/fuel filter housing, and a medical component.

* * * * *